United States Patent [19]

Su

[11] Patent Number: 4,615,858
[45] Date of Patent: Oct. 7, 1986

[54] METHOD AND APPARATUS PRODUCING DECORATIVE MELT FRACTURE PATTERNS ON POLYMERIC PRODUCTS

[75] Inventor: Tien-Kuei Su, Pittsford, N.Y.

[73] Assignee: Mobil Oil Corporation, New York, N.Y.

[21] Appl. No.: 734,435

[22] Filed: May 16, 1985

[51] Int. Cl.$^4$ .............................................. B29C 47/12
[52] U.S. Cl. .................................. 264/564; 264/40.6; 264/40.7; 264/130; 264/176.1; 425/380; 425/465; 425/467
[58] Field of Search ...................... 264/564, 40.6, 40.7, 264/176 R, 130; 425/380, 144, 467, 465

[56] References Cited

U.S. PATENT DOCUMENTS

| | | | |
|---|---|---|---|
| 3,415,796 | 12/1968 | Souder et al. | 264/209.7 |
| 3,574,808 | 4/1971 | Matthews et al. | 264/209.8 |
| 3,920,782 | 11/1975 | Cogswell | 264/209.7 |
| 3,942,937 | 3/1976 | Prober et al. | 425/461 |
| 3,980,744 | 9/1976 | Cogswell | 264/327 |
| 4,080,138 | 3/1978 | Hutchinson et al. | 425/467 |
| 4,522,776 | 6/1985 | Ramamurthy | 264/564 |

OTHER PUBLICATIONS

Trans. Soc. Rheology; 1, 203, J. P. Tordella, (1957).
J. Appl. Polymer Science, 21, 1177, J. Vlachopulos, et al. (1977).
"Capillary Flow of Molten Polyethylene-A Photographic Study of Melt Fracture", Transactions of the Society of Rheology, vol. 1, 203 (1957) J. P. Tordella.
"A Comparison of Melt Fracture Initiation Conditions in Capillaries and Silts", Journal of Applied Polymer Science, vol. 21, 1177, J. Vlachopulos & T. W. Chan (1977).

Primary Examiner—Jeffery Thurlow
Attorney, Agent, or Firm—Alexander J. McKillop; Michael G. Gilman; Charles J. Speciale

[57] ABSTRACT

Beautifying patterns on the surface of extruded polymer products are produced by forcing molten polymer through a die which is coated with a controlled pattern of low surface energy material. Melt fracture of the polyethylene as it emerges from the die is produced at gaps in the coating material which may be silicon, inorganic or fluorine containing polymers.

15 Claims, 6 Drawing Figures

METHOD AND APPARATUS PRODUCING DECORATIVE MELT FRACTURE PATTERNS ON POLYMERIC PRODUCTS

BACKGROUND OF THE INVENTION

This invention relates to the extrusion of products from molten polymers and more particularly, to producing beautifying patterns on the surface of these products.

A variety of products are made from thin polymer material such as polyethylene. For example, small bags are used in the packaging of sandwiches and the like; larger bags are used as shopping bags; and even larger bags are used for containing trash. These bags are typically made from blown polyethylene produced by forcing molten polyethylene through an annular extruding die.

These products frequently show surface texture. It is known that extruding polymers at a critical shear level produces melt fracture. See Trans. Soc. Rheol., 1, 203, J. P. Tordella, (1957); and J. Appl. Polym. Sci., 21, 1177, J. Vlachopulos and T. W. Chan (1977).

My co-workers and I have concluded that melt fracture of linear polyethylene, including linear low density polyethylene (LLDPE), occurs in the die, or as the molten polyethylene emerges from the die.

Polymeric products with uncontrolled random melt fracture texture have poor appearance. However, controlled melt fracture texture can provide a different, pleasing appearance.

It is an object of the present invention to provide extruded products with a decorative melt fracture pattern.

It is another object of the present invention to control the polymer extruding process so that beautifying patterns on the surface of the extruded products are produced.

SUMMARY OF THE INVENTION

In accordance with the present invention, a polymer extruding die is coated with a controlled pattern of low surface energy material such as silicon, inorganic polymer, or fluorine containing polymers. Molten polymer is forced through the die to produce a product with melt fracture in controlled areas formed by uncoated portions of the annular die gap.

In a blown film extrusion process, the die body, or the central mandril, is coated with a pattern of low surface energy material with uniform width gaps. As the polyethylene is blown through the annular die gap, an attractive melt fracture pattern appears on the product emerging from the die.

This decorative pattern can be controlled by changing the output rate of polymer forced through the die. Alternatively, controlling the temperature of the molten polyethylene changes the pattern.

The foregoing and other objects, features, and advantages of the invention will be better understood from the following more detailed description and appended claims.

DESCRIPTION OF THE PREFERRED EMBODIMENT

Figure 1:
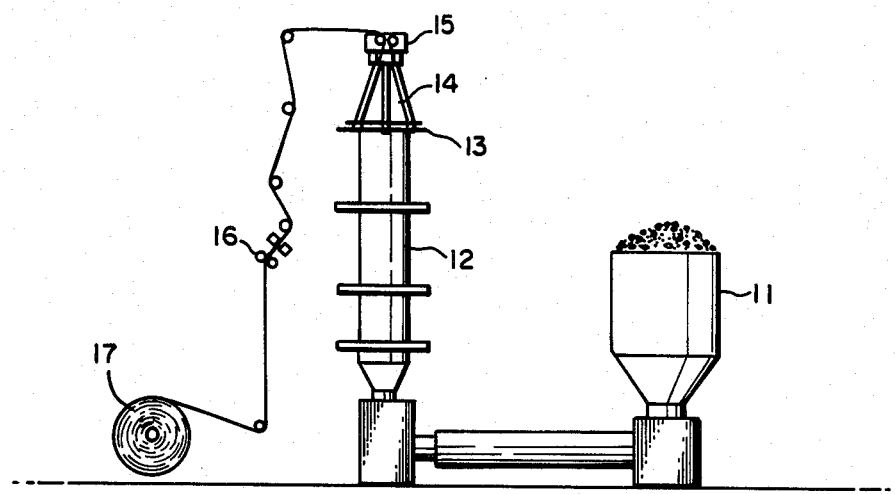
FIG. 1 depicts the overall extruding process in which the present invention is used.
Figure 2:
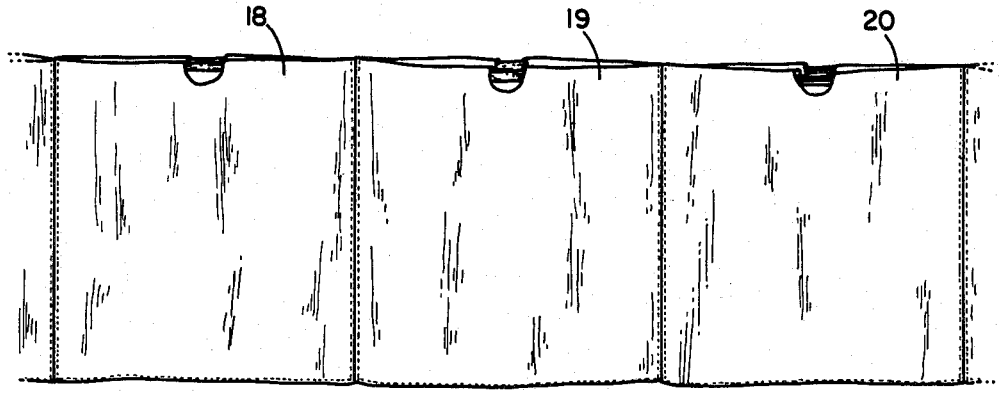
FIG. 2 depicts trash bags which are typical products of the process.

In FIG. 1, raw plastic stock is fed into hopper 11, is heated, and forced by an extruder assembly 12 through a circular extruding die 13. The extruded polyethylene is blown to form a continuous tubular column 14 of extruded thermoplastic film. The film is collapsed by collapsing tower 15 and drawn off by pinch rollers 16. A roll 17 of once folded polyethylene film is produced. This is used to make products such as the trash bags 18-20 shown in FIG. 2.

Figure 3:
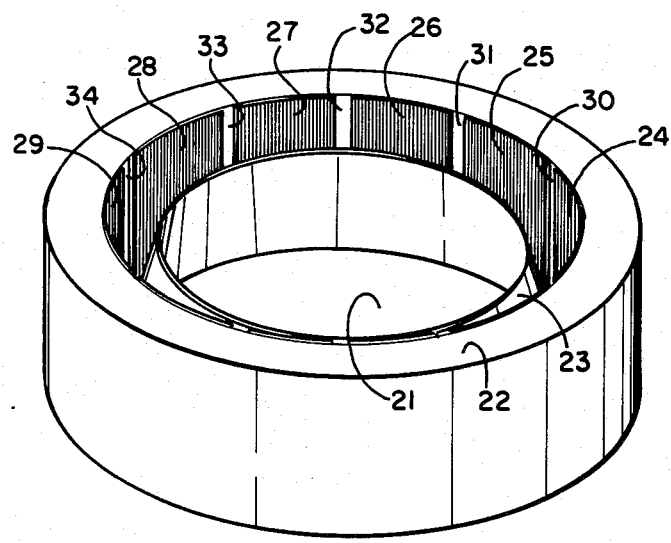
FIG. 3 shows the extruding die in accordance with the present invention.

FIG. 3 shows the circular die ring 13 of the present invention in more detail. It includes a central mandril 21 and a die body 22. An annular die gap 23 extends between central mandril 21 and die body 22. Molten polyethylene is forced through the die gap by blowing to produce a tube of thin film.

In accordance with the present invention, the die body is coated with a low surface energy material in the areas 24-29. Uniform width gaps 30-33 extend in the direction of the die gap.

Figure 6:
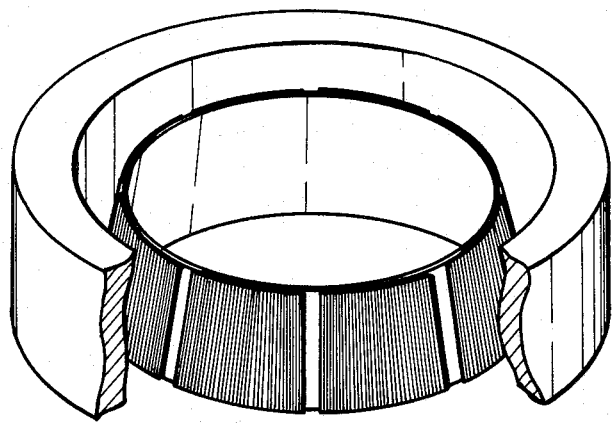
FIG. 6 depicts the mandril coated with a low surface energy material.

This controlled pattern of low surface energy material produces a controlled pattern of melt fracture when molten polymer is forced through the die gap. The coating pattern may be on the die body or on the central mandril as shown in FIG. 6, or on both.

Suitable low surface energy coating materials include silicon, inorganic polymer, or fluorine containing polymers. As examples, Viton A having a critical surface tension of 20 dynes/cm, and Silverstone 19, from DuPont, having a critical surface tension of 19 dynes/cm, can be used. In the following examples, the uncoated die had a critical surface tension of 30 dynes/cm.

EXAMPLES

I

Figure 4:
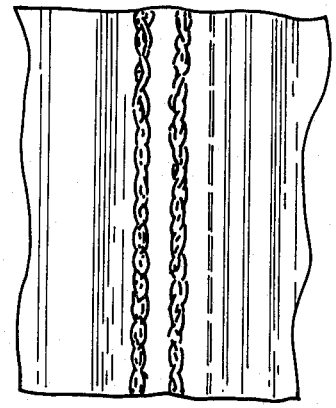
FIG. 4 is one example of a decorative pattern produced in accordance with the invention.

A 1¼" PolySytem extruder was used to produce thin polyethylene film having the pattern shown in FIG. 4. The die surface was coated with a pattern of Viton A low surface energy material as shown in FIG. 3. Union Carbide 7068 LLDPE resin was forced through the die at a temperature of 400° F.

FIG. 4 shows the decorative melt fracture pattern on a portion of the film surface produced through a 1½" die with a die gap of 18-20 mils at the output rate of 7 lbs. per hour.

II

Figure 5:
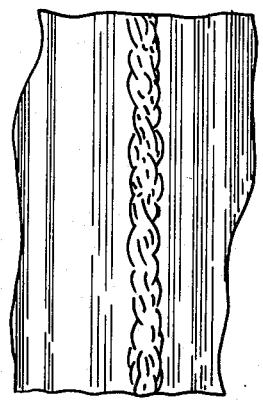
FIG. 5 is another example of a decorative pattern produced by the invention.

FIG. 5 shows the beautifying structure on the film surface created by extruding through a 3" die in a 2½" Sterlex extruder with a die gap of 37-40 mils at the output rate of 50 lbs. per hour. Union Carbide 7068 LLDPE resin was forced through the die at a temperature of 430° F. The die surface was coated with a pattern of Silverstone 19 as shown in FIG. 3.

The patterns produced were attractive and distinctive. Furthermore, the patterns tend to render random melt fracture patterns less noticeable.

While a particular embodiment of the invention has been shown and described, various modifications are within the true spirit and scope of the invention. The appended claims are, therefore, intended to cover all such modifications.

What is claimed is:

1. The method of producing beautifying patterns on the surface of extruded polymer products comprising:
coating an extruding die with a controlled pattern of low surface energy material; and
forcing molten polymer through said die to produce melt fracture texture in the product extruded through the uncoated part of said die.

2. The method recited in claim 1 wherein said die has a central mandril inside a die body with an annular die gap between said mandril and said die body.

3. The method recited in claim 2 wherein said low surface energy material is applied to one of said central mandril and said die body.

4. The method recited in claim 3 wherein said controlled pattern includes a coating of low surface energy material having uniform width gaps extending in the direction of said annular die gap.

5. The method recited in claim 3 wherein said coating is on said die body.

6. The method recited in claim 1 wherein said low surface energy material is a polymer containing an additive selected from the group consisting of silicon, inorganic polymers, and fluorine.

7. The method recited in claim 1 wherein said polymer is linear low density polyethylene.

8. The method recited in claim 7 wherein the step of forcing molten polymer through said die comprises:
blowing a thin film of said linear low density polyethylene through said die.

9. The method recited in claim 1 further comprising:
controlling the flow rate of said molten polymer through said die to control the pattern of melt fracture in said products.

10. The method recited in claim 1 further comprising:
controlling the temperature of said molten polymer to control the pattern of melt fracture in said products.

11. Apparatus for producing beautifying patterns on the surface of extruded products comprising:
an extruding die having a controlled pattern of low surface energy material in said die; and
means for forcing molten polymer through said die to produce melt fracture texture in the product extruded through the uncoated part of said die.

12. The apparatus recited in claim 11 wherein said die comprises:
a central mandril;
a die body surrounding said central mandril with an annular die gap between said central mandril and said die body.

13. The apparatus recited in claim 12 wherein said controlled pattern of low surface energy material is on one of said central central and said die body.

14. The apparatus recited in claim 13 wherein said controlled pattern of low surface energy material comprises:
a polymer coating on said die body having uniform width gaps extending in the direction of said annular die gap.

15. The apparatus recited in claim 13 wherein said controlled pattern of low surface energy material comprises:
a polymer coating on said central mandril having uniform width gaps extending in the direction of said annular die gap.

* * * * *